(12) United States Patent
Pack et al.

(10) Patent No.: US 8,042,138 B2
(45) Date of Patent: *Oct. 18, 2011

(54) APPARATUS AND METHOD FOR PROVIDING AND OBTAINING PRODUCT INFORMATION THROUGH A BROADCAST SIGNAL

(75) Inventors: Bok Hyun Pack, Kyunggi-do (KR); Young Kuk Kim, Kyunggi-do (KR); Hyun Ahn, Kyunggi-do (KR); Han Seop Ryu, Kyunggi-do (KR); Yeo Han Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/875,524

(22) Filed: Sep. 3, 2010

(65) Prior Publication Data

US 2010/0333144 A1   Dec. 30, 2010

Related U.S. Application Data

(63) Continuation of application No. 11/415,172, filed on May 2, 2006, now Pat. No. 7,827,577, which is a continuation of application No. 09/832,871, filed on Apr. 12, 2001, now abandoned.

(30) Foreign Application Priority Data

| Apr. 12, 2000 | (KR) | ................................ 2000-9335 |
| May 8, 2000 | (KR) | ............................... 2000-24395 |
| Jan. 5, 2001 | (KR) | ..................................... 2001-690 |

(51) Int. Cl.
*H04N 5/445*   (2011.01)
*G06F 13/00*   (2006.01)
*G06F 3/00*    (2006.01)

(52) U.S. Cl. ................ 725/52; 725/44; 725/47; 725/50; 725/51

(58) Field of Classification Search .................... 725/44, 725/47, 50–52
See application file for complete search history.

(56) References Cited

U.S. PATENT DOCUMENTS

| 5,287,181 A | 2/1994 | Holman |
| 5,774,664 A | 6/1998 | Hidary et al. |
| 5,774,666 A | 6/1998 | Portuesi |

(Continued)

FOREIGN PATENT DOCUMENTS

JP   09-121302   5/1997

(Continued)

OTHER PUBLICATIONS

Korean Search Report dated Jun. 12, 2003.

(Continued)

*Primary Examiner* — Hunter Lonsberry
(74) *Attorney, Agent, or Firm* — KED & Associates, LLP

(57) ABSTRACT

The present invention relates to an apparatus and method for providing and obtaining product information through a broadcast signal. In this present invention, information identifying a product item, which is in a scene to be presented from a broadcast signal, is provided together with a broadcast signal, then a signal receiving terminal stores the product information for a new product item and displays the stored information to a viewer to select one product item while or after watching an interesting broadcast program, and transmits data identifying a selected product item to a predetermined web site and receives web site address for the selected item from that site. As a result, detailed information for the selected item is acquired from a server addressed by the received web site address.

18 Claims, 8 Drawing Sheets

U.S. PATENT DOCUMENTS

| | | | |
|---|---|---|---|
| 5,778,181 | A | 7/1998 | Hidary et al. |
| 5,818,935 | A | 10/1998 | Maa |
| 5,905,865 | A | 5/1999 | Palmer et al. |
| 5,929,849 | A | 7/1999 | Kikinis |
| 6,018,768 | A | 1/2000 | Ullman et al. |
| 6,154,771 | A | 11/2000 | Rangan et al. |
| 6,349,410 | B1 | 2/2002 | Lortz |
| 6,467,093 | B1 | 10/2002 | Inoue et al. |
| 6,505,160 | B1 | 1/2003 | Levy et al. |
| 6,553,178 | B2 | 4/2003 | Abecassis |
| 6,615,408 | B1 | 9/2003 | Kaiser et al. |
| 7,523,478 | B2 | 4/2009 | Blackketter et al. |
| 2002/0010941 | A1 | 1/2002 | Johnson |
| 2002/0026645 | A1 | 2/2002 | Sun et al. |
| 2002/0042813 | A1 | 4/2002 | Ullman et al. .............. 709/203 |
| 2002/0044658 | A1 | 4/2002 | Wasilewski et al. .......... 380/239 |
| 2002/0080163 | A1 | 6/2002 | Morey |
| 2003/0005463 | A1 | 1/2003 | MacRae et al. .............. 725/112 |
| 2003/0169879 | A1 | 9/2003 | Akins et al. .................... 380/241 |
| 2004/0168198 | A1 | 8/2004 | Nishioka et al. |
| 2007/0169166 | A1 | 7/2007 | Sako et al. |

FOREIGN PATENT DOCUMENTS

| | | |
|---|---|---|
| JP | 10-174082 | 6/1998 |
| JP | 2004-029953 | 1/2004 |
| JP | 2005-141191 | 6/2005 |
| KR | 1999-0032116 | 5/1999 |
| KR | 2000-0001380 | 1/2000 |
| KR | 10-2000-0012257 | 3/2000 |
| KR | 10-2001-0086675 | 9/2001 |

OTHER PUBLICATIONS

Korean Office Action dated May 29, 2003.
Office Action dated Feb. 2, 2010 for U.S. Appl. No. 11/819,919.
Korean Notice of Allowance dated Nov. 2, 2007.
Final Office Action dated Jul. 6, 2010 in U.S. Appl. No. 11/819,919.
Office Action dated Jan. 21, 2001 from U.S. Appl. No. 11/415,172.
Office Action dated May 12, 2010 from U.S. Appl. No. 11/415,172.
Office Action dated Jul. 6, 2010 from U.S. Appl. No. 11/819,919.
Office Action dated Mar. 14, 2011 from U.S. Appl. No. 11/819,919.
Office Action dated Aug. 15, 2011 for U.S. Appl. No. 11/819,919.

| item code | item name | URL Information |
|---|---|---|
| ⋮ | ⋮ | ⋮ |
| 00010001 | racket | http://www.lgshopping.com |
| 00101001 | footwear | http://www.lgsport.com |
| 10000001 | pants | http://www.lgfashion.com |
| 10100000 | car | http://www.lgcar.com |
| 00101011 | dvd | http://www.lge.co.kr |
| ⋮ | ⋮ | ⋮ |

URL-included Information Table

| still picture index | icon image data | URL Information |
|---|---|---|
| ⋮ | ⋮ | ⋮ |
| still picture # n | icon image # k-2 | http://www.lgshopping.com |
| | icon image # k-1 | http://www.lgsport.com |
| | icon image # k | http://www.lgfashion.com |
| still picture # n+1 | icon image # k+1 | http://www.lgcar.com |
| | icon image # k+2 | http://www.lge.co.kr |
| ⋮ | ⋮ | ⋮ | icons

| URL-included Information Table ||||
|---|---|---|
| still picture index | position data for (X,Y) | URL Information |
| ⋮ | ⋮ | ⋮ |
| still picture # n | $(X,Y)_{k-2}$ | http://www.lgshopping.com |
| | $(X,Y)_{k-1}$ | http://www.lgsport.com |
| | $(X,Y)_k$ | http://www.lgfashion.com |
| still picture # n+1 | $(X,Y)_{k+1}$ | http://www.lgcar.com |
| | $(X,Y)_{k+2}$ | http://www.lge.co.kr |
| ⋮ | ⋮ | ⋮ |

APPARATUS AND METHOD FOR PROVIDING AND OBTAINING PRODUCT INFORMATION THROUGH A BROADCAST SIGNAL

The present application is a continuation of U.S. patent application Ser. No. 11/415,172, filed May 2, 2006 (now U.S. Pat. No. 7,827,577), which is a continuation application of U.S. patent application Ser. No. 09/832,871, filed Apr. 12, 2001 now abandoned, which claims priority from Korean Patent Applications 19335/2000, filed Apr. 12, 2000, 24395/2000 filed May 8, 2000, and 690/2001 filed Jan. 5, 2001, respectively, the subject matters of each application are incorporated herein by reference.

BACKGROUND OF THE INVENTION

1. Field of the Invention

The present invention relates to a method and an apparatus for providing information related to products presented in a scene of a broadcast program from a broadcasting station or an internet broadcasting server to enable a viewer to obtain supplementary information such as shopping information for the products from a network using the provided information.

2. Background of the Related Art

With the rapid development and dissemination of communication technology, a lot of individuals have been connected to global data networks or the 'Internet' through high-speed cables. This technology makes it possible for most people to easily access information from the Internet at home. Thus, many enterprises are using the Internet as a marketing tool to deliver product advertising information.

In addition, television sets are now able to adopt data communication functions through the use of a set top box (STB), which can be used to receive a digital broadcast signal. This means that a television set can now be able to communication bi-directionally between the television viewer and the broadcaster. Now, more enterprises have begun to use this new technology as bidirectional marketing tools. That is, they insert product information into broadcast programs, rather than through a standard commercial, to be received by the television sets. Then, viewers can obtain supplementary information for buying products through selecting particular product information using their television set.

In marketing methods in the related art, broadcast programs include product information displayed during the broadcast program. When a viewer enters a specific button while watching the broadcast program, the television set maintains a still picture of the broadcast, and lists product names associated with the products presented in the still picture.

When a viewer selects one among the listed product names, the STB of the television set sends a product code linked with the selected product name to a predetermined place, usually a web site of a broadcasting station through a connected communication cable. After receiving the selected product codes, the predetermined web site sends the particular STB of the television set an accessing address of a site which will provide detailed shopping information including appearance and price of the selected products.

After the television set receives the accessing address, it can then resend this address through the Internet through the communication cable automatically or when a viewer requests to do so. Through these operations, the viewer receives detailed shopping information from the addressed site through an STB on their television set and can then purchase it through an on-line commercial transaction also through the STB on their television set.

However, this method of the related art is not very fast as it takes considerable time to acquire detailed shopping information for the products and a viewer is not able to watch a broadcast program during that time. Thus, viewers may not access the detailed shopping information even though desirable products are displayed on a screen, if they are unwilling to suspend watching a program to access this service.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a product information delivering method and apparatus enabling a viewer to obtain shopping information independently when products are displayed in a scene.

It is another object of the present invention to provide a product information delivering method and apparatus enabling a viewer to obtain shopping information rapidly when products are displayed in a scene.

It is another object of the present invention to provide a product information delivering method and apparatus enabling a viewer to obtain shopping information more quickly when products are displayed in a scene and also allow simultaneous watching of a broadcast program while the information is displayed.

It is another object of the present invention to provide a product information delivering method and apparatus enabling a viewer to obtain shopping information for products displayed in a scene when a program is over without interruption of the program watching.

It is another object of the present invention to provide a product information delivery method and apparatus enabling a viewer to obtain shopping information for a desirable product which was displayed in program presentation without causing an interruption in the viewing of a television program.

In a preferred embodiment of the present invention, broadcast programs are provided together with product information including address information of a site to access detailed shopping information for desirable products which are displayed in the broadcast program presentation.

In another preferred embodiment of the present invention, broadcast programs are provided for a presentation terminal such as a television set ("TV") or a personal computer ("PC") together with product information, then a presentation terminal compares received product information with previous product information, stores the received product information if it is confirmed that the received product information is new based on the comparison, and displays the stored product information onto a screen or a monitor upon a viewer's request.

In another preferred embodiment of the present invention, a method for obtaining supplementary information on an item in a broadcast signal is provided, including receiving a digital broadcast signal, extracting information identifying an item from the received digital broadcast signal, comparing the extracted identifying information of the item with identifying information of other items, and storing the extracted identifying information based on the comparison result.

In another preferred embodiment of the present invention, a broadcasting enhancement system is provided, including a broadcast signal receiver receiving a broadcast signal, a decoder linked to the broadcast signal receiver that decodes and separates at least video data for display on a display device and first information for selectable items in the video data, a frame composer coupled to the display device to provide the first information to the display device, and a controller coupled to the decoder and the frame composer, wherein the controller displays the first information concurrently with the video data according to user commands.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

The invention will be described in detail with reference to the following drawings in which like reference numerals refer to like elements wherein.

DETAILED DESCRIPTION OF PREFERRED EMBODIMENTS

Figure 1:
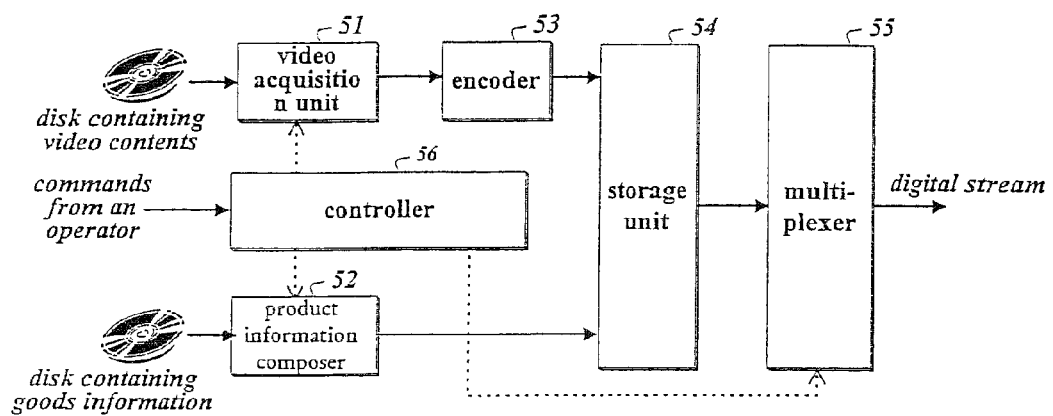
FIG. 1 is a block diagram of a preferred embodiment of an apparatus for constructing and delivering product information through broadcast programs according to the present invention.

The apparatus of FIG. 1 includes a video acquisition unit 51 which can read video contents from a data storage medium, an encoder 53 for encoding the read video contents into decodeable data at a receiving device, a product information composer 52 which can acquire product information from data storage media, a storage unit 54 which can store encoded video data and any acquired product information, a multiplexer 55 which can multiplex the stored video data and product information according to particular time codes for synchronizing product information with video data in a transmission, and a controller 56 for controlling the encoder 53 to encode the video contents segment by segment according to the commands of an operator and prepositioning a time code in both the encoded segment of video contents and product information associated with the encoded contents segment.

In the above-mentioned apparatus of FIG. 1, several alternatives may be employed. For example, the product information composer 52 may acquire product information by reading data entered from an operator through a key input means rather than from a storage medium. Also, the product information can include product identifying information such as product names and related-scene-describing text, icons, or players' names, and any additional information such as address information of a site to access shopping information for a desirable product can be displayed in a scene.

The manner in which the apparatus operates centers around the multiplexer, as illustrated in FIG. 1. The operation of multiplexing and transmission of video contents and product information begin when the video acquisition unit 51 reads or reproduces video contents from a storage medium and applies a segment of the video contents specified by the controller 56 to the encoder 53. The encoder 53 can then encode the applied contents segment into compressed data of a predetermined format and can store them in the storage unit 54. Then, the controller 56 can select a part of the product information that is associated with the just-encoded contents segment according to instructions such as an operator's command for choice of products or the like, and can store the selected product information in the storage unit 54. This selected part of the product information can then be presented in a broadcast scene to be viewed from the just-encoded contents.

After the encoded contents and product information are stored, the controller 56 can generate a time code to synchronize the stored product information with the associated contents segment in transmission, and can configure the transmission of both the contents segment and product information. After these operations are done, the configured data can then be stored in the storage unit 54.

Figure 2:
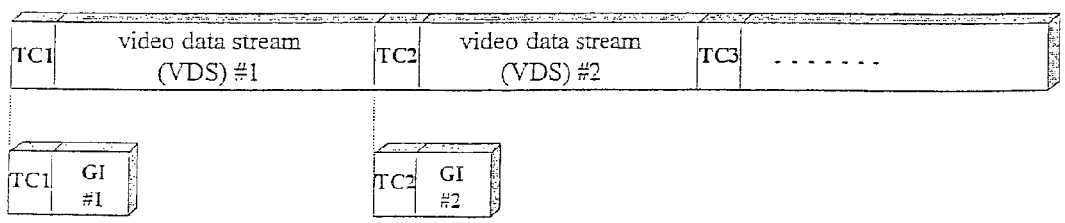
FIG. 2 shows a preferred embodiment of the present invention in which a broadcast program and product information are stored.

In the meantime, as illustrated in FIG. 2, while the encoding and configuring operation is being conducted or after the entire video contents are encoded, the multiplexer 55 can transmit the encoded video contents stored in the storage unit 54 sequentially. In this transmission, the multiplexer 55 inserts and transmits product information (GI) whose time code (TC) is identical to that of a just-transmitted video contents segment (VDS). According to this transmitting method of the video acquisition unit 51, the stored data is multiplexed and can be transmitted in a sequence with the video contents and the encoded information synchronized to the time codes, where the prepositioned time codes are not transmitted.

Video contents and product information may be transmitted immediately after they are multiplexed or may be stored for a later broadcast. When broadcasting is done after multiplexing, the multiplexed video contents and product information are usually recorded in a portable storage medium for broadcasting from that storage medium when a corresponding program is scheduled to go on the air.

The multiplexed data from the multiplexer 55 is preferably broadcast in two ways. One is a wireless broadcast, in which the multiplexed data can transmitted over the air after it is channel-encoded. The other is a wired broadcast, in which the multiplexed data is transmitted to all connected data terminals, such as PCs, STB TVs or Web TVs, after the format is converted appropriately.

Figure 3:
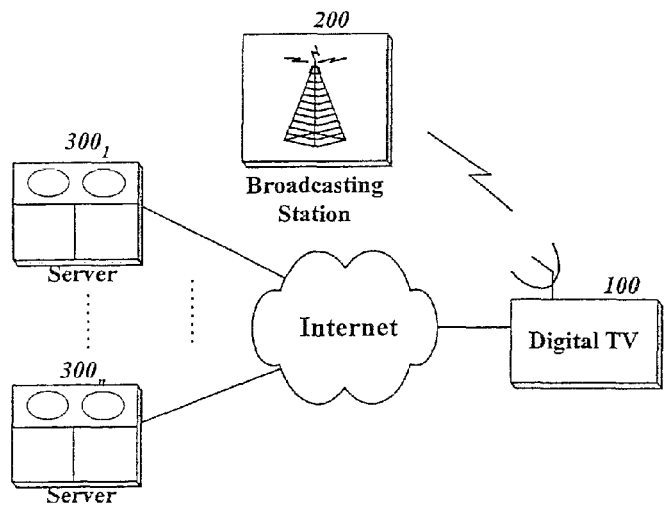
FIG. 3 illustrates a network of a preferred embodiment of the present invention in which a digital television set is connected to a global data network.

Instead of the aforementioned product information transmitting method, product information may be inserted into a service information field specified in digital broadcast standard to be received by a digital television set. FIG. 3 shows a network in which a digital broadcast receiver, for example, a digital television is connected to a global data network, that is, the 'Internet'. The digital broadcast receiver 100 receives a wireless broadcast signal including product information and presents high quality video pictures onto its corresponding receiver after decoding the received broadcast signal from the broadcasting station 200. Furthermore, the digital broadcast receiver 100 can connect to various servers including product information providing servers 300 or on-line commercial transaction servers 300 through Internet.

Figure 4:
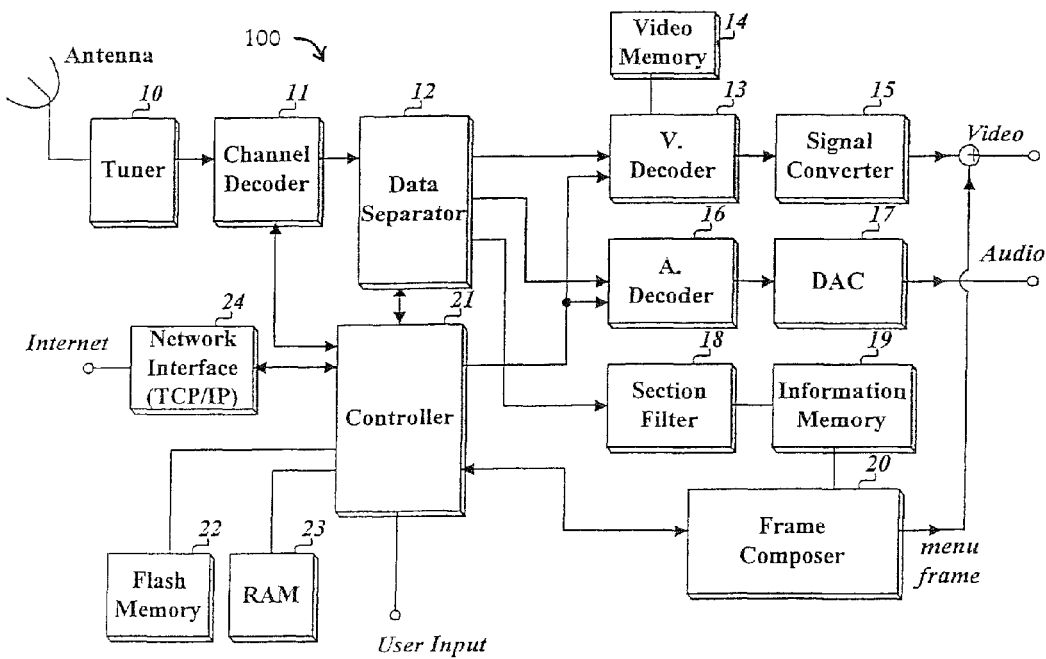
FIG. 4 is a block diagram of a digital broadcast receiver according to a preferred embodiment of the present invention.

FIG. 4 is a block diagram of the digital broadcast receiver 100, which may be a digital television, that includes a tuner 10 for tuning broadcast to a selected frequency band; a channel decoder 11 for demultiplexing signals of the tuned band into individual channel data and decoding data of a chosen channel; a data separator 12 for separating the decoded data into compressed video, compressed audio, and service information data including product information; a video decoder 13 for restoring the compressed video data into original data; a video memory 14 for storing the decoded original video data and the temporary data generated during the decoding operation; a signal converter 15 for converting the decoded video data into a NTSC- or PAL-formatted video composite signal; an audio decoder 16 for restoring the compressed audio data into original PCM data; a D/A converter 17 for converting the restored PCM data into an analog sound; a section filter 18 for separating the service information data according to its attribute into preferably program specific information (PSI), electronic program guide (EPG), URL (Universal Resource Locator)-included information for various products which will be broadcast; an information memory 19 for storing the separated PSI, EPG, and URL-included information; a frame composer 20 for constructing a video frame for item selection from the stored service information; a network interface 24 for executing internal TCP/IP program and implementing a web browsing program to send and receive data to and from the Internet; a controller 21 for controlling the above elements in order to execute a viewer's request; and a flash memory 22 and a RAM 23 for storing control data which is required for control operation of the controller 21.

In the digital broadcast receiver 100 configured as illustrated in FIG. 4, the tuner 10 can tune a frequency band carrying a signal of a chosen channel and can send the tuned signal to a channel decoder 11. The channel decoder 11 can then demodulate the tuned signal into to a 4~8-channel-multiplexed digital data stream, conduct channel-decoding for only a data stream belonging to a chosen channel according to a channel selection control signal applied from the controller 21, and can then output the channel-decoded data stream to the data separator 12.

Figure 5:
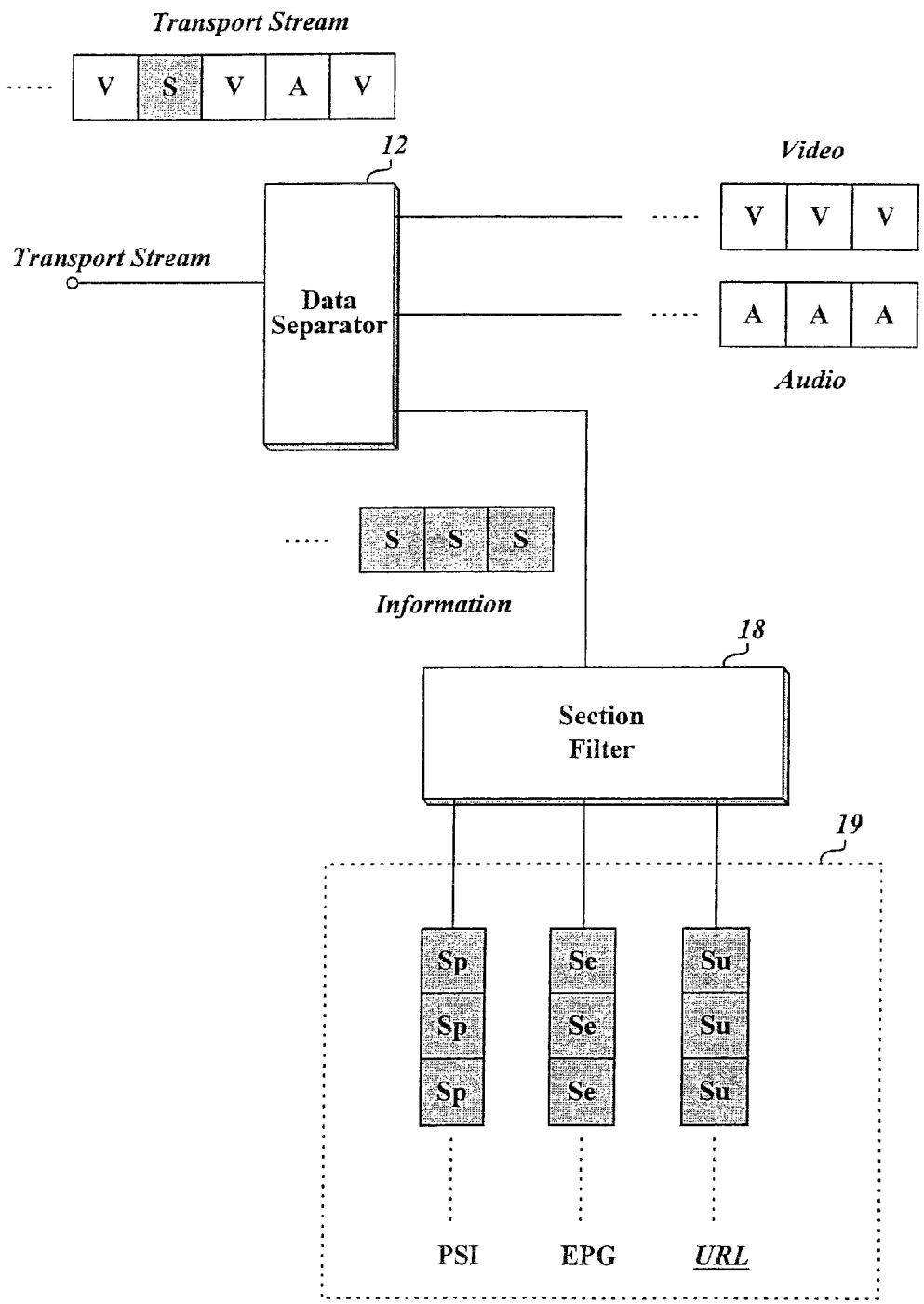
FIG. 5 illustrates preferred embodiments of functions of the data separator and the section filter of the receiver of FIG. 4 schematically.

The channel-decoded data stream from the channel decoder 11 preferably has a data format as shown in FIG. 5 in which video, audio, and service information data including product information are interleaved with each other. A data separator 12 can be used to check the header of the data stream unit to determine attributes of the data stream unit, and then can separate the channel-decoded data stream, which consists of stream units, into preferably three categories according to the attribute each header of the stream unit indicates.

Next, a video decoder 13 can be used to decode compressed video data outputted from the data separator 12 into original video data, and a signal converter 15 can be used to convert the original video data into a NTSC- or PAL-formatted video composite signal which is adequate to present onto a conventional displaying apparatus. If the decoded frame is corresponding to an intra-coded picture, the video decoder 13 can store every decoded video frame into the video memory 14. If an additional video frame of a still picture is contained in the video data stream, the video decoder 13 can store the still picture frame into the video memory 14 without outputting into the signal converter 15. Additionally, the audio decoder 16 can be used to decode compressed audio data from the data separator 12 into original PCM audio data which can be converted into sound signals by a D/A converter 17.

The service information data can preferably provide transport packets like video and audio data, where the transport packet often has a header and a payload field, and the header of a transport packet carrying service information can have a type indicator. A section filter 18 can be used differentiate between PSI, EPG, and URL-included product information to determine the payload field data of a transport packet classified into service information data belong to based on the type indicator of a header. Through this type of identification, the section filter 18 can store the PSI, EPG, and URL-included goods information separately in the information memory 19. However, additional product information or types of product information can be filtered and stored in the information memory 19.

Transport packets carrying the URL-included product information can contain information on products to be presented in certain scenes in payload fields. This information may be product codes and URL information of a web site for providing shopping information such as price and appearance, and so on. This information formation may also include additional information such as product names, station identification, other related products, weather information, etc.

Instead of product information, the broadcast may include an icon image which can be used with URL-information provided products and entry information of intra-coded or still picture in which position information about coordinates at which a URL-information provided products are present as marked or highlighted (e.g., 110) in the intra-coded or still picture. Therefore, the information memory 19 can be able to store URL information, product codes, and various product-related information or the like, other than PSI and EPG.

Figures 6, 7:
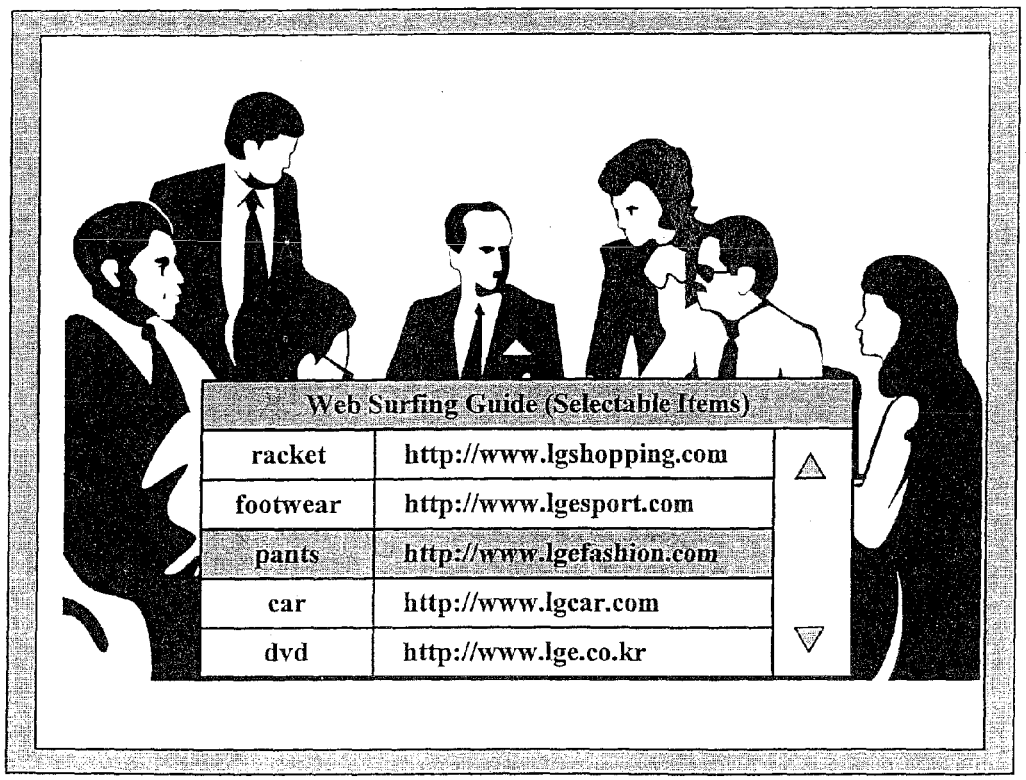
FIG. 6 illustrates a preferred embodiment of address information and product information received and stored according to the present invention.
FIG. 7 illustrates a preferred embodiment of a screen of a selection video frame, which is constructed from the data example of FIG. 6.

FIG. 6 shows an example of one of several methods to access a web site providing detailed information on certain products presented in a scene displayed on a screen of a digital television through using URL information, product codes, and additional information stored. However, the present invention is not intended to be so limited. In FIG. 6, the URL information, product codes, and additional information including product names can be stored in the information memory 19. A product code can be used to aid in preventing repetitious storage of URL information, etc. by preventing information with the same code from being stored more than once by determining if a transport packet outputted from the data separator 12 corresponds to URL-included information. When this occurs, the section filter 18 can be used to check the product code for the data contained in the payload field of the transport packet and examines whether the previous code has been stored before. Only if the new product code is different from every other code stored in the information memory 19 would the data be stored and contained in the payload. Through this operation, single storage of product codes, URL information, and product names can be achieved even when the products are displayed repeatedly possibly during several scenes of a broadcast.

Additionally, a digital television can be used with a preferred embodiment of the present invention. In this case, a viewer watching the digital television 100 can input a selection, for example by entering a 'web-surfing' button while or after watching a broadcast program, and a separate controller 21 can be used to stop (e.g., temporarily alternating accesses or the like) the video decoder 13 from decoding the data stream of the broadcast program and to read the information from the product codes, product names, and URL information stored in the information memory 19 and send this information to a frame composer 20. The frame composer 20 can then construct video frames for display of the items for a viewer's selection of a desirable item.

FIG. 7 is an example of a screen useable in a digital television with an item selection video frame displayed onto same. In this example, product names and their related URL information are listed within the display so that a desirable item can be selected by a viewer through an 'up' and a 'down' button or the like. Also, in order to maximize the number of viewable selectable products, the URL information may not be listed so that more selectable product names are displayed onto a screen.

Upon display of an item selection video frame, a viewer can choose an item through entering a 'selection' through a specified button on a remote controller or other input device, such as a front panel of a television, and then, the controller 21 can read the URL information associated with the selected product, and can activate a TCP/IP program of the network interface 24 to enable data communication through the Internet. After activation, the controller 21 can transmit the read URL information through the network interface 24, so one or more web pages including detailed shopping information on the selected products can be received from a web site addressed by the selected URL information. The received web pages can then be interpreted by a web browsing program through the network interface 24 and web pages' interpreted contents can be sent to the frame composer 20, which can display the interpreted contents including price, appearance, etc on the selected products onto full or partial screen.

Through the above-explained operation, a viewer can more quickly acquire detailed shopping information related with desirable products present in a scene displayed onto a screen from a server on the Internet during or after watching a TV scene.

Figures 8, 9:
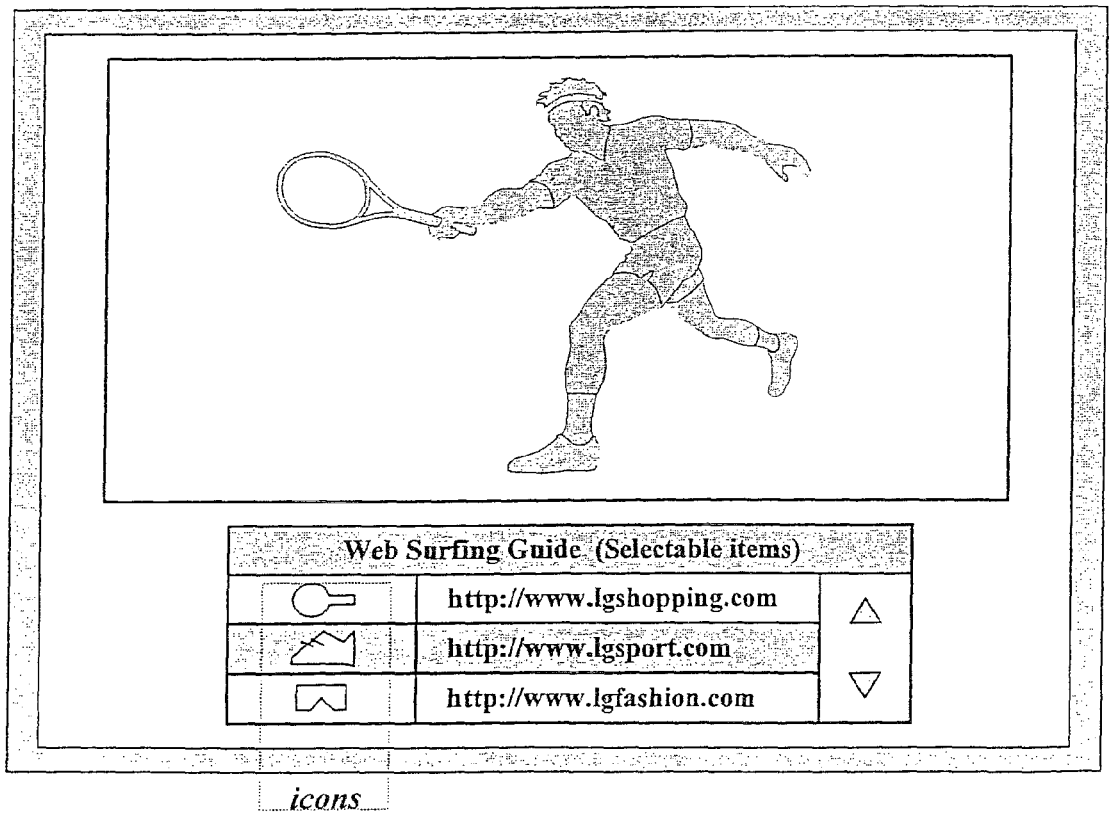
FIG. 8 illustrates another preferred embodiment of address information and product information received and stored according to the present invention.
FIG. 9 illustrates another preferred embodiment of a screen of a selection video frame, which is constructed from the data example of FIG. 8.

FIG. 8 shows another example of accessing URL information and additional information through the use of superimposed icon images and intra-coded or still picture images. The icon image may be more desirable because it can be used to make products more distinguishable in a broadcast scene than in intra-coded or still picture images, and the icon image can also be replaced with a product name or the like, if desired.

Again, a digital television can be used with a preferred embodiment of the present invention. In this case, a viewer watching the digital television 100 can enter a specific button, for example, a 'web-surfing' button while or after watching a broadcast program and the controller 21 can stop a current program decoding in order to exclusively control the frame composer 20 to display product information of FIG. 8, which can be stored prior to a surfing request onto a screen. In addition, the controller 21 can control the signal converter 19 to output only the latest received intra-coded or still pictured stored in the video memory 14, and can read icon images and URL information having the same entry information or index number and send all the read data to the frame composer 20. The frame composer 20 can then construct a selection window including all or a part of the product information in a screen with the displayed picture in the background. FIG. 9 is an example of a such-constructed video frame displayed on a screen. The URL information of FIG. 9 may optionally be presented on a menu screen so that a viewer can select one item among the displayed products through an 'up' and a 'down' button.

If a viewer selects an icon image related with a desirable product on the displayed still picture, the controller 21 can read any URL information linked with the selected icon image or images, and can receive and deliver detailed information of selected products which are contained in a web page to a viewer through conducting the above-explained communication operation using the read URL, information.

If an item is not displayed in the still picture, a viewer can request another picture like a previous picture or any one with products displayed therein. Then, the controller 21 can examine the information stored as shown in FIG. 8 to find out if any entry information indicative of intra-coded or still picture preceding the present displayed picture is available, and can output the picture identified by the found entry information and URL information of products linked with the outputted picture can be displayed.

If there is a scroll request through the 'up' and 'down' buttons of an input device and the current selection bar is on the boundary of a list window, then the controller 21 can read the previous or next picture and the information linked to that picture and can then display the information.

Figures 10, 11:
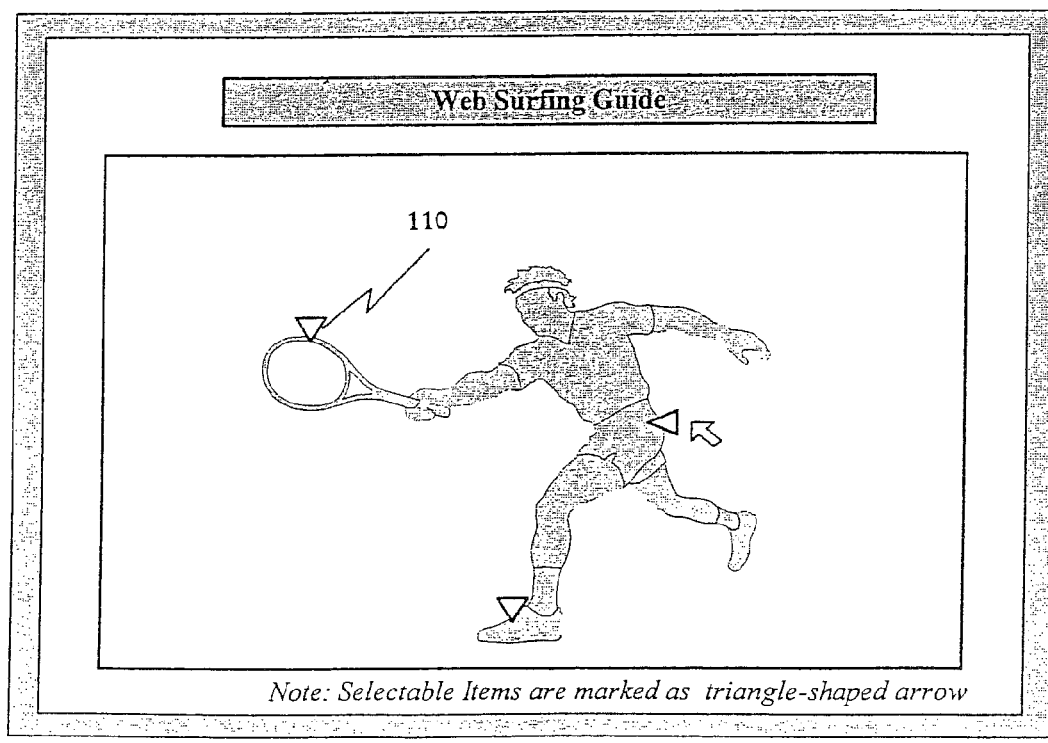
FIG. 10 illustrates another preferred embodiment of address information and product information received and stored according to the present invention.
FIG. 11 illustrates another preferred embodiment of a screen of a selection video frame, which is constructed from the data example of FIG. 10.

FIG. 10 shows another preferred embodiment, in which URL information and other information can be accessed through reading of specific coordinates of a screen when product item coordinates are known coordinates on a screen of an intra-coded or still picture. For the viewer's convenience, it is preferable that the broadcasting station provides an additional still picture in which an area around a product item where the product information is linked through a highlighted or a marked area. FIG. 11 is an example of a still picture constructed according to this method. In FIG. 11, an area around a product item is arrow-marked 110 and if that area is accessed through the specific coordinates of the area, then information can be accessed.

In this embodiment, a still picture can be displayed together with one or several marks (if a viewer requests a product selection menu of FIG. 8) and an arrow-shaped pointer can be generated and displayed on the still picture so that a viewer can select a desirable product. If a viewer places the pointer over a highlighted or a marked item, the controller 21 can detect the pointer's position value and can compare the detected position value with the stored coordinate values of FIG. 10. If there is a stored coordinate value whose distance from the detected position is shorter than a threshold value, the controller 21 can then read the URL information linked with that stored coordinate value, and the viewer can thus receive detailed information of a selected item written in a web page conducting the above-explained communication operation using read URL information.

Figure 12:
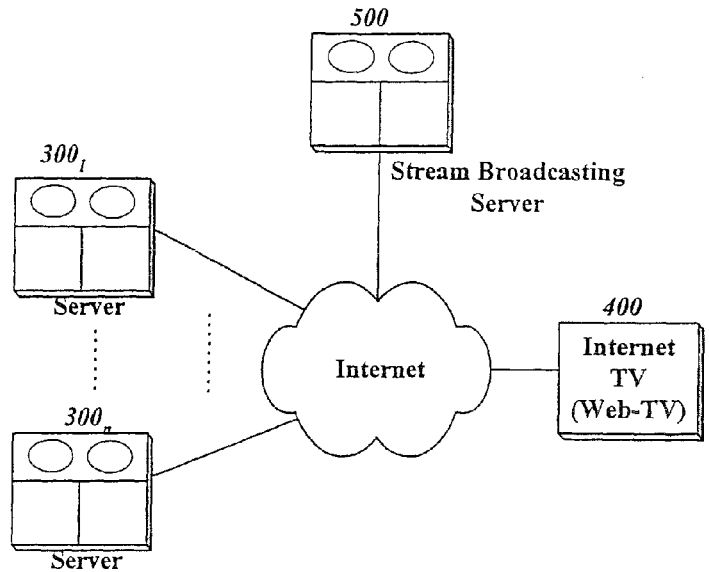
FIG. 12 illustrates a preferred embodiment network in which a web TV is connected to a global data network according to the present invention.

An information acquisition procedure can also be conducted in a terminal receiving a wired broadcast signal including product information provided through the Internet according to the present invention. FIG. 12 shows a network in which a network terminal 400, for example, a web TV, is connected to Internet. The network terminal 400 can receive a wired broadcast data stream including product information from a broadcasting server 500 and can produce video pictures after decoding the received broadcast data stream. Furthermore, the network terminal 400 can connect to various servers ($300_1$~$300_N$) including product information providing servers and on-line commercial transaction servers through the Internet.

Figure 13:
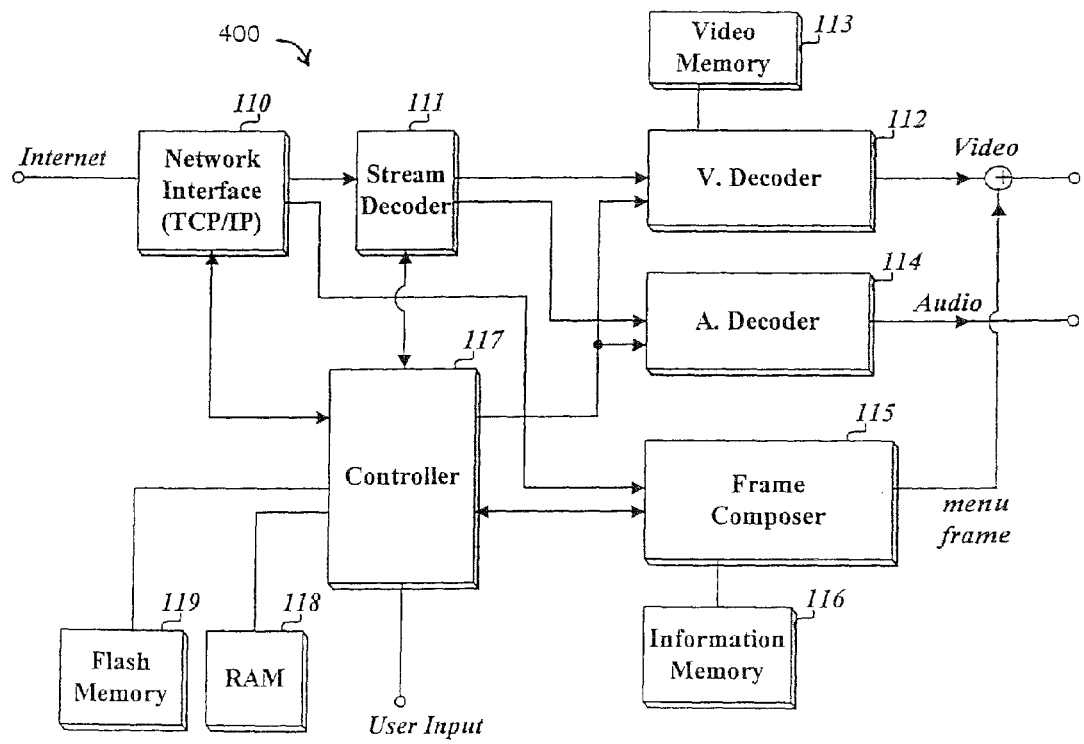
FIG. 13 illustrates a block diagram of a preferred embodiment use of a web TV according to the present invention.

FIG. 13 is a block diagram of a web TV network terminal 400 including a network interface 110 for receiving data streams broadcast in multi-casting or uni-casting format, and extracting program streams, information related to products or other items of interest to be presented in scenes, and accessing address information from the received data streams; a stream decoder 111 for decoding the program streams into compressed video and audio streams; a video decoder 112 for restoring the compressed video stream into original video data; a video memory 113 for storing the decoded original video data and temporary data generated during the decoding operation; and audio decoder 114 for restoring the compressed audio stream into original audio data; and information memory 116 for storing the product information and its related accessing address information; a frame composer 115 for constructing an item selection video frame, which is for a viewer's selecting a product item, from the stored information; a controller 117 for controlling the above elements to execute a viewer's request; and a flash memory 119 and a RAM 118 for storing web browsing program and control data which is required for control operation of the controller 117.

If a data stream broadcast through the Internet is in a format processible by the media player of a computer based format, such as Windows™, the stream decoder 111, the video decoder 112, and the audio decoder 115 may be replaced with a program executed by a central processing unit (CPU).

In the web TV 400 of FIG. 13, the network interface 110 can receive data streams through Internet and can extract program streams and product information streams according to the pre-specified protocol. The extracted program streams can have moving picture data streams which can be sent to the stream decoder 111 while the extracted product information streams can be sent to the frame composer 115.

Figure 14:
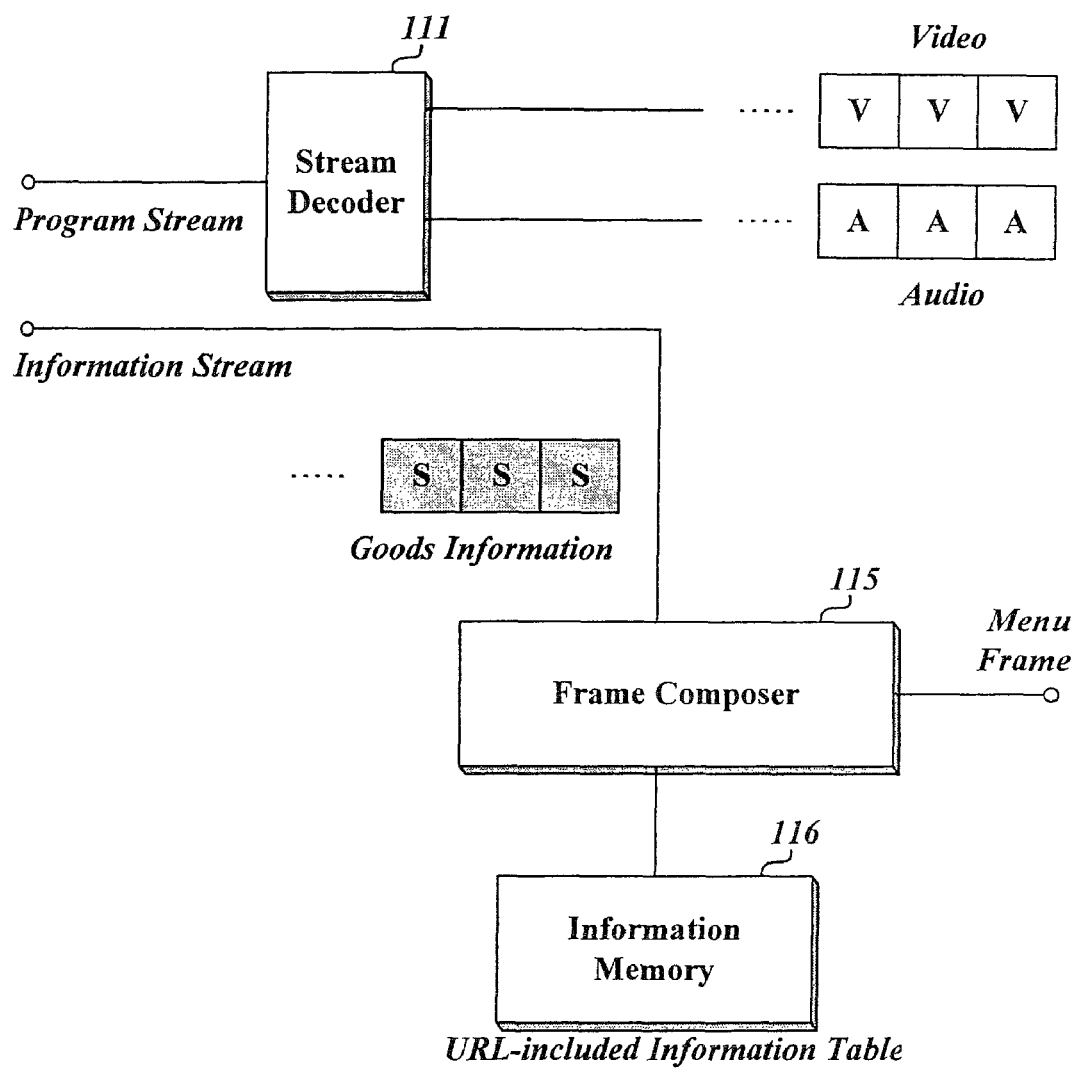
FIG. 14 illustrates the functions of the preferred embodiment stream decoder and frame composer of the preferred embodiment web TV of FIG. 13 schematically.

The stream decoder 111 can be used to decode program streams into compressed video and audio data according to attributes of the data stream, for example, as shown in FIG. 14. The compressed video and audio data can be restored into original video and sound data respectively by the video decoder 112 and the audio decoder 114. The video decoder 112 can store intra-coded video frame in the video memory 113 among the decoded video data under the control of the controller 117 and can send the entry information for indexing the stored intra-coded video frame to the frame composer 115, which links the received entry information with the product information received at the time when the entry information is received.

If the data streams broadcast from the broadcasting server 500 have additional still picture data for selecting a product item, the video decoder 112 can store the still picture data in the video memory 113 without outputting the picture data for presentation, and can provide the frame composer 115 with entry information for indexing the stored still picture data.

The frame composer 115 can be used to extract information from the product information streams and can store them in the information memory 116. When information needs to be displayed, the frame composer 115 can read a part of the stored information and convert it for display onto a screen of the web TV 400 so that a viewer can select an item.

In some cases, when product information is delivered through a wired broadcast digital data stream, there may not be linking information between video pictures and the delivered product information. When this occurs the web TV 400 can preferably associate an intra-coded or still picture, which is received at the closest time when the product information, such as product code, is received with the product information, and can generate linking information between that intra-coded or still picture and the information received. However, the present invention is not intended to be so limited. Linking information can then be generated and stored in the information memory 116 together with corresponding product information. This lining information generating/storing operations can be conducted by the frame composer 115 under control of the controller 117.

Linking information must be generated and stored in order to display a scene including a product item for which product information is provided, when a viewer requests selection menu for product items. However, linking information is only essential if simultaneous broadcast of the program and the product item is desired. Otherwise, product items can be listed with a background page having no relation with the listed goods as shown in FIG. 7 for example.

In the case of wired broadcasts through the Internet, a product code can also be included, similar to the aired broadcasts so that the same product information is never stored in the information memory 116 more than once.

The web TV 400 of FIG. 13 can show received goods information to a viewer in various ways similar to the digital television 100. For example, the information can be stored by the web TV 400 in the information memory 116 as shown in FIG. 6, and can include a selection menu like FIG. 7 displayed by the frame composer 115 when a viewer requests. When icon images and URL information are provided, these can be stored as shown in FIG. 8 and can be presented as shown in FIG. 9. And if a coordinate value for an item or URL information are provided, this information is stored as shown in FIG. 10 and a selection frame as constructed in FIG. 11.

If a viewer selects one item in the selection frame, the controller 117 can search for URL information related to the selected item, and can send it to the network interface 110. The network interface 110 can then transmit the received URL information to the Internet according to the specified protocol. At this time, the web browsing program can be stored in the flash memory 119 upon execution by the controller 117. After that, a server addressed by the sent URL information can transmit web page data, and the network interface 110 can receive the web page data and send them to an activated web browsing program. The web browsing program can then interpret the web page data, and send text and video data to the video decoder 112 and audio data to the audio decoder 114, where the video and audio decoder 112 and 114 can then decode the respective received data into video and sound signals to be presented to a viewer. Through this presentation, a viewer can view detailed information on a selected product contained in the displayed web page.

In the above-explained preferred embodiments, URL information for a site to acquire detailed information on a product can be provided along with other information about other items including products. However, URL information can be provided through a different process, such as one for a digital television, if a viewer requests it.

In FIG. 4, the digital television 100 can store product information, not including URL, information in the information memory 19, so that a viewer may shop for products through the Internet after a television or other broadcast program has been completed. At this time, product codes can be checked to prevent same product information from being stored more than once by using a section filter 18 which can be used to compare a current received product code with previous ones stored in the information memory 19, and can then store the received product code along with associated product information in the information memory 19 based upon where the received product code had previously been stored.

Various product identifying information may be used instead of the product code. A product name can also be used as product identifying information to prevent repetitive storage of identical products. However, products in the same category and therefore with the same name, which were presented in different scenes may not be distinguished, such as Joe's pants and Tom's pants. Therefore, it is preferable to append to product name description information such as name of a place where a product item is and name of a player who wears a product item, for example, 'computer (in Joe's room)', 'computer (in Tom's room)', 'pants (Joe)', 'pants (Tom)', etc.

When product information, not including URL information, has been stored in the information memory 19, a viewer watching a TV can engage an input device, such as a 'web-surfing' button, while or after watching a broadcast program. When the input device is engaged, the controller 21 can then stop decoding the current program and can control the frame composer 20 to display product information stored based upon a request by the viewer.

If a viewer selects one item among several items which were present in a scene displayed on a screen, the controller 21 can send product identifying information, for example, a product's code, name, or additional description information, associated with the selected product to a predetermined site, for example, a server of a broadcasting station through the network interface 24. The server receiving the product identifying information can then discriminate items based on the received information and can search for a site address at which detailed information for the discriminated products is accessible, then transmit the found site address to the network interface 24 of the digital television 100.

The controller 21, upon receiving the site address through the network interface 24, can then resend the address to the Internet through the network interface 24 and information for the selected product is accessed and received by the addressed server. The information can then be outputted in a video frame showing contained information through a web browsing function executed by the network interface 24 and signal converting function of the frame composer 20.

The broadcasting station site can also provide brief information such as appearance and price of an item when transmitting site information for the discriminated products. Further, when information is provided, it can be displayed onto a screen under the control of the controller 21, so that if detailed information on the item is requested from a viewer, the received site address can be sent through the Internet to acquire detailed information for the product from a related server.

As described above, preferred embodiments of an apparatus and method for providing and obtaining product information through a broadcast signal according to the present invention have various advantages. The preferred embodiments of an apparatus and method for providing and obtaining product information through a broadcast signal according to the present invention enable a viewer to acquire more quickly detailed shopping information for products contained in a scene when the scene is displayed onto a screen during watching a broadcast program, and also enable a viewer to obtain detailed shopping information for a desirable product which was displayed in program presentation without interruption of program watching after a program is ended.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A network device of processing both service information and audio/video (A/V) data, the network device comprising:
   a tuner configured to receive both service information and A/V data from a digital broadcasting network, wherein the service information includes a uniform resource locator (URL) information;
   a section filter configured to collect sections on the service information using a section filtering process;
   a frame composer configured to display an icon informing a user that an additional information is available while displaying the A/V data, wherein the URL information is used to retrieve the additional information; and
   a network interface configured to access the URL information via an internet network when the icon is selected, and to receive the additional information.

2. The network device of claim 1, wherein the service information further includes both a first information on an icon image and a second information on an icon position.

3. The network device of claim 1, wherein the icon is bounded to the A/V data.

4. The network device of claim 1, wherein the icon is unbounded to the A/V data.

5. The network device of claim 1, wherein the network device includes an internet protocol television (IPTV).

6. A method of processing both service information and audio/video (A/V) data in a network device, the method comprising:
   receiving both service information and A/V data from a digital broadcasting network, wherein the service information includes a uniform resource locator (URL) information;
   collecting sections on the service information using a section filtering process;
   displaying an icon informing a user that an additional information is available while displaying the A/V data, wherein the URL information is used to retrieve the additional information;
   accessing the URL information via an internet network when the icon is selected; and
   receiving the additional information.

7. The method of claim 6, wherein the displaying comprises:
   displaying multiple icons, wherein each of the multiple icons is mapped to a product in the video data among the A/V data and is further located in the product.

8. The method of claim 7, wherein the accessing comprises:

determining whether a distance between a displayed pointer and the icon is less than a threshold value; and accessing the URL information via the internet network when the distance is determined to be less than the threshold value.

9. The method of claim 6, further comprising:

displaying the additional information while displaying the A/V data.

10. The method of claim 9, wherein the displaying the additional information displays the additional information in a partial screen while overlay-displaying the A/V data.

11. The method of claim 9, wherein displaying the additional information displays the additional information in a full screen.

12. The method of claim 6, further comprising:

storing the received additional information to a memory; and displaying a stored additional information when receiving an additional request.

13. The method of claim 6, wherein the icon is bounded to the A/V data.

14. The network device of claim 6, wherein the icon is unbounded to the A/V data.

15. The method of claim 6, wherein the additional information includes at least one of product information and weather information.

16. The method of claim 6, wherein the network device includes an internet protocol television (IPTV).

17. The method of claim 6, wherein the service information further includes both a first information on an icon image and a second information on an icon position.

18. The method of claim 6, wherein the displaying comprises:

displaying a selection list identifying a plurality of the additional information, wherein the selection list includes a scroll bar used to select each of the plurality of the additional information.

* * * * *

UNITED STATES PATENT AND TRADEMARK OFFICE
CERTIFICATE OF CORRECTION

| | | |
|---|---|---|
| PATENT NO. | : 8,042,138 B2 | Page 1 of 1 |
| APPLICATION NO. | : 12/875524 | |
| DATED | : October 18, 2011 | |
| INVENTOR(S) | : Bok Hyun Pack et al. | |

It is certified that error appears in the above-identified patent and that said Letters Patent is hereby corrected as shown below:

ON THE TITLE PAGE:

Item (30)    Foreign Application Priority Data should read:

| April 12, 2000 | (KR) | 19335/2000 |
| May 8, 2000 | (KR) | 24395/2000 |
| January 5, 2001 | (KR) | 690/2001 |

Signed and Sealed this
Seventeenth Day of January, 2012

David J. Kappos
*Director of the United States Patent and Trademark Office*